Oct. 7, 1924.
E. J. SWEETLAND
1,510,809
METHOD OF LIQUID CLARIFICATION
Filed Nov. 30, 1918
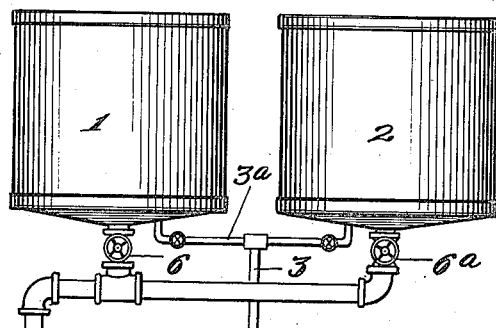
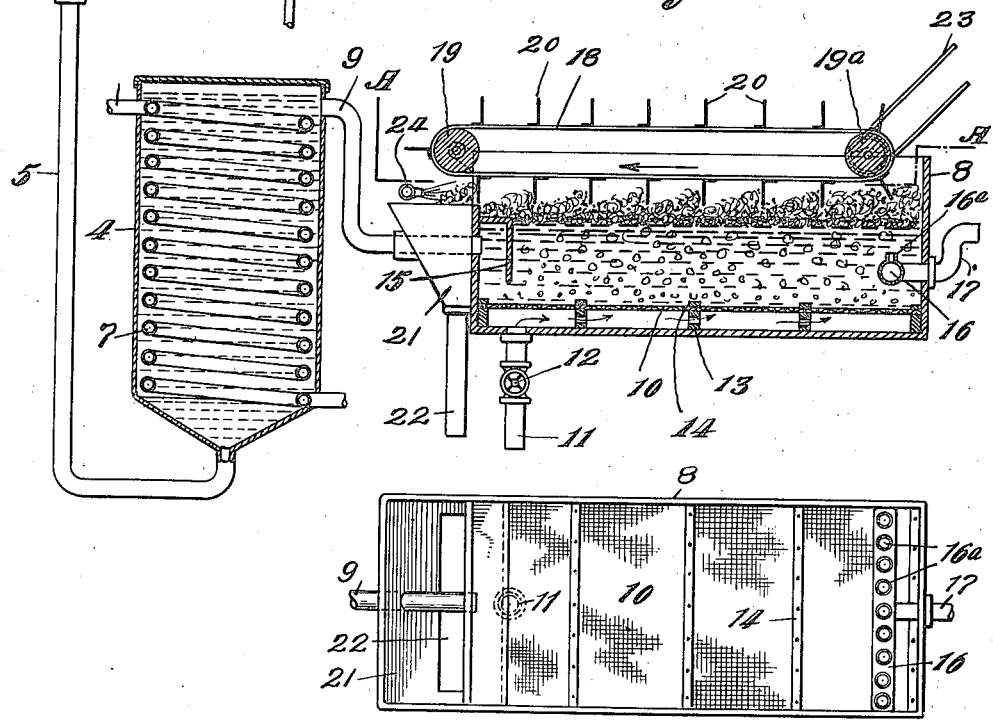
Fig. 1.
Fig. 2.
Fig. 3.
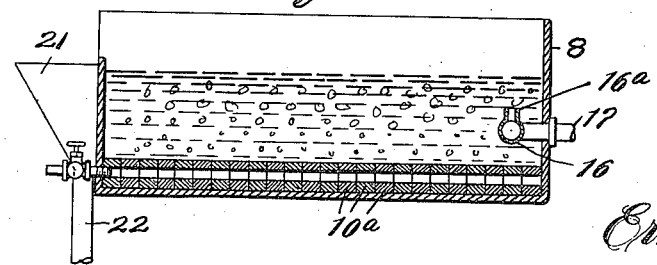
INVENTOR
Ernest J. Sweetland
BY
ATTORNEY Patented Oct. 7, 1924.

1,510,809

UNITED STATES PATENT OFFICE.

ERNEST J. SWEETLAND, OF MONTCLAIR, NEW JERSEY, ASSIGNOR TO UNITED FILTERS CORPORATION, OF NEW YORK, N. Y., A CORPORATION OF DELAWARE.

METHOD OF LIQUID CLARIFICATION.

Application filed November 30, 1918. Serial No. 264,794.

*To all whom it may concern:*

Be it known that I, ERNEST J. SWEETLAND, a citizen of the United States, residing in Montclair, county of Essex, and State of New Jersey, have invented certain new and useful Improvements in Methods of Liquid Clarification, of which the following is a specification.

My present invention relates more particularly to a new method of clarifying liquid, the principles of the invention being specifically applicable to clarification of sugar refinery syrups.

In one method of refining sugar, as heretofore practiced, after the raw sugar is melted with the addition of sufficient water to form a syrup of proper consistency, it is subjected to a process of defecation, which ordinarily involves the use of lime, phosphoric acid and heat. The action of the defecating agents causes the contained impurities which are largely in the nature of gummy substances to form a somewhat gelatnous, flocculent precipitate, which very gradually settles to the bottom of the container. This known and commonly practiced method of defecation may consume a period of several hours before the supernatant liquor becomes clear.

In many refineries the liquor, after being defecated as above, is passed through the well known types of bag filters which separate the precipitate from the clear liquor. In other well known processes of clarifying sugar syrups, the lime and phosphoric acid may be greatly reduced or omitted entirely, and the syrup treated with a moderate quantity of infusorial earth sometimes called "kieselguhr" or "filter-cel." When this treatment is used pressure filters are employed, the syrup being forced through a filter fabric under pressure to remove the suspended solids including the infusorial earth, and thus producing a clear filtrate.

There are certain disadvantages in the use of all types of filters for this purpose, the principal ones being intermittent operation, expense of filter cloth and labor.

My invention in its broadest aspect comprehends a process of continuous clarification. A method which may be practiced by the employment of apparatus of a simple and inexpensive character and which at the same time will require a minimum amount of labor in handling.

My process furthermore involves a new clarifying principle,—one which reverses the ordinary process of precipitating the impurities and drawing off the supernatant liquor; that is to say, my method involves the idea of causing the impurities to rise or elevate to the surface of the liquor, where they are subsequently skimmed off or otherwise removed, the clarified liquid being drawn off from beneath, all of which can be performed in a continuous and uninterrupted manner. To effect the upward raising of the impurities to the top of the liquor, I may employ the principle of air diffusion by creating fine air bubbles by passing compressed air through fabric or other suitable media possessing fine pores or minute interstices capable of breaking up the air into a correspondingly large number of extremely minute columns, so that the liquor covering the surface of the medium will cause the air to immerge in the form of correspondingly small bubbles. The action of these bubbles passing through and commingling with the liquor containing the flocculent precipitate is that they become attached to the particles of impurities and through their balloon-like action, gravity is overcome and the particles are carried to the top of the liquor where they can be skimmed off or caused to overflow and thus be separated from the clear liquor.

According to another phase of my invention, I add oil to the solution to be treated, such as pine oil of the variety used in mineral flotation, mineral oils or cottonseed oil as circumstances might dictate. In refining sugar, the oil is preferably added to the sugar before it is melted so that the particles of impurities will be pre-coated before being brought into contact with the water used to dissolve the sugar; the addition of such oil will facilitate the clarification of the liquor and make more rapid the operation of the process.

Having thus generally explained the broad underlying principles of my invention, I will specifically describe certain apparatus suitable for the practice thereof, having it understood that the illustrated embodiments herein described are examples only of some of the known ways in which the benefits of the invention may be secured. I, therefore, do not wish to be limited to the manner in which these disclosed principles may be embodied or practiced.

Reference being made to the accompanying drawings, Figure 1 is a view partly in vertical section of one type of apparatus by means of which my new method may be practiced.

Figure 2 is a top plan view taken of line A—A of Figure 1.

Figure 3 is a view in vertical cross section of a modified form of tank shown in Figure 2.

Referring in detail to Figures 1 and 2, I may employ one or more tanks 1 and 2 as containers for the raw sugar syrup, which has been treated with a defecating agent, such as the lime and phosphoric acid above referred to. To cause a thorough mixture of these ingredients, I admit compressed air through the pipe 3, leading from a suitable source of supply and branch pipes 3ª leading to the respective tanks. In lieu of the compressed air, mechanical means may be employed for the purpose. Preferably situated below these tanks, I arrange a heating tank 4 communicating with the tanks 1 and 2, by means of the pipe 5, suitable valves 6 and 6ª being interposed in the pipe line to control the feed of the syrup. The heating tank 4 is provided with a steam coil 7, but, obviously, any other heating arrangement may be used for the purpose of the invention. After the treated syrup has passed from the storage tank 1 or 2 to the tank 7, where it is heated and reduced to a high state of fluidity, it then passes to a clarifying tank 8, the pipe 9 affording communication thereto. This clarifying tank is preferably rectangular in form and is provided with a porous partition 10, which may consist of several layers of heavy canvas, porous stone, wood blocks 10ª (see Figure 3), or any other medium provided with minute openings or interstices which will serve to break up and distribute the air or gas which may be employed in the clarifying process. This air or gas is admitted through a pipe 11, which is suitably valve-controlled at 12. The porous partition 10 is supported above the bottom of the tank 11 by perforated supporting members 13 held down by the fastening members 14. It will be apparent that as the compressed air is admitted through the pipe 11, it will become diffused throughout the entire space between the bottom of the tank and the porous partition. Its egress will be in small streams which will be broken up into the minute bubbles above referred to. In order to cause a more even distribution of the liquor, as it is admitted to the clarifying tank 11 through the pipe 9, a baffle plate 15 is positioned immediately in front of the discharge orifice.

The air bubbles in rising to the surface of the liquor in the clarifying tank 11 become attached to the particles of flocculent precipitate and attached impurities and carry them upwardly to aggregate upon the surface of the liquor forming as it were a froth or foam. The clarified liquid is continuously discharged through a perforated pipe 16, having receiving orifices 16ª positioned in the wall of the tank and connected with a curved exterior discharge pipe 17, the connection between the two pipes being of a swivel nature so that the elevation of the discharge opening may be varied to control the level of the liquid within the tank. It will be understood that the flow of the liquid from the supply tanks 1 and 2 through the heating tank 4 and the clarifying tank 8 is continuous and the parts are so proportioned that the liquor passing from the point of ingress to the point of egress in the clarifying tank will be sufficiently acted upon by the air bubbles to be thoroughly treated so that when it is discharged from the pipe 17, it will be completely cleared of all impurities.

To remove the separated impurities which are now floating upon the surface of the liquid in the form of foam, I provide a skimming arrangement in the form of a continuously operated belt member 18 playing over suitable rollers 19 and 19ª, supported in a suitable manner above the clarifying tank. Fastened to the belt 18 are a plurality of flights or fins 20, which are drawn across the top surface of the liquid and function to scrape or push as it were, the foam containing the impurities to one end of the tank where it can be discharged into a hopper 21 communicating with a discharge outlet 22. The belt or conveyor 20 operates slowly and is driven by a suitable power belt 23 operating over one end of the roller 19ª. To facilitate the discharge of the foam and the impurities which it carries, I provide a spray pipe 24 supplying a number of small streams of water which are discharged into the foam is it flows into the hopper.

While I have in the above disclosed the principles of my invention, by reference to the illustrated apparatus herein described and with particular reference to the clarification of refinery liquids, I wish it distinctly understood that I do not limit myself to the specific illustrated structures or to the application of the principles to the treatment of sugar syrup, since not only may the methods be practiced by other structural means but the principles themselves may be found of value when applied to other purposes.

This application is a continuation in part of an application heretofore filed by me on September 12th, 1916, Serial No. 119,747, entitled Gas diffuser, which has resulted in the issuance of Patent 1,403,578, dated January 17, 1922. In said application, I have disclosed a method of clarifying liquors containing finely divided solids in suspension, using air of gas bubbles to overcome the gravity of the particles, which would otherwise fall to the bottom, the particles attaching themselves to the bubbles and being elevated thereby to the surface of the solution where they may be removed in any suitable manner.

Having thus described my invention what I intend to claim and desire to secure by Letters Patent is:

1. The method of defecating sugar syrup which consists in treating the syrup with a defecating agent and heating the mixture, passing finely divided particles of a gas from the bottom upwardly through the mixture, and removing the impurities which rise to the top of the mixture.

2. A continuous method of defecating sugar syrup which consists in treating the syrup with a defecating agent, passing the treated syrup through a heating device and into a clarifying tank, continuously passing finely divided particles of a gas from the bottom of the tank upwardly through the mixture therein, continuously removing the impurities which rise to the top of the mixture, and continuously drawing off the clarified syrup.

ERNEST J. SWEETLAND.